(12) United States Patent
Bachofer

(10) Patent No.: US 9,874,284 B2
(45) Date of Patent: Jan. 23, 2018

(54) VALVE DEVICE

(71) Applicant: Mack & Schneider GmbH, Filderstadt (DE)

(72) Inventor: Steffen Bachofer, Filderstadt (DE)

(73) Assignee: MACK & SCHNEIDER GMBH, Filderstadt (DE)

( * ) Notice: Subject to any disclaimer, the term of this patent is extended or adjusted under 35 U.S.C. 154(b) by 0 days.

(21) Appl. No.: 15/517,029

(22) PCT Filed: Oct. 15, 2015

(86) PCT No.: PCT/EP2015/073915
§ 371 (c)(1),
(2) Date: Apr. 5, 2017

(87) PCT Pub. No.: WO2016/059170
PCT Pub. Date: Apr. 21, 2016

(65) Prior Publication Data
US 2017/0241556 A1 Aug. 24, 2017

(30) Foreign Application Priority Data
Oct. 17, 2014 (DE) .......................... 10 2014 221 180

(51) Int. Cl.
F16K 11/06 (2006.01)
F16K 11/074 (2006.01)
F01P 7/14 (2006.01)

(52) U.S. Cl.
CPC ............ F16K 11/0746 (2013.01); *F01P 7/14* (2013.01); *F01P 2007/146* (2013.01)

(58) Field of Classification Search
CPC ..... Y10T 137/86863; Y10T 137/87692; F16K 11/0655; F16K 11/0746
(Continued)

(56) References Cited

U.S. PATENT DOCUMENTS 2,079,743 A * 5/1937 Krieger ............... F16K 11/0746
137/607
4,112,975 A 9/1978 Csanady, Jr.
(Continued)

FOREIGN PATENT DOCUMENTS

DE 675 735 C 5/1939
FR 646 259 A 11/1928

OTHER PUBLICATIONS

English Translation of the International Preliminary Report on Patentability from Corresponding Application No. PCT/EP2015/073915; dated Apr. 20, 2017.
(Continued)

*Primary Examiner* — Reinaldo Sanchez-Medina
(74) *Attorney, Agent, or Firm* — Pearne & Gordon LLP

(57) ABSTRACT

The application relates to a valve device, including a valve housing which has at least three connection openings, each of which open into a chamber of the valve device, including two sealing disc units arranged at a distance from each other, each of which lies between two adjacent chambers and has a fixed sealing disc and at least one rotatable sealing disc, wherein each of the rotatable sealing discs and the fixed sealing discs of each sealing disc unit has at least one throughflow opening in order, in at least one overlapping position of the throughflow openings, to release a throughflow cross-section between the adjacent chambers, and including an actuating shaft, which is connected to the rotatable sealing discs for conjoint rotation.

14 Claims, 5 Drawing Sheets

Figure 1:
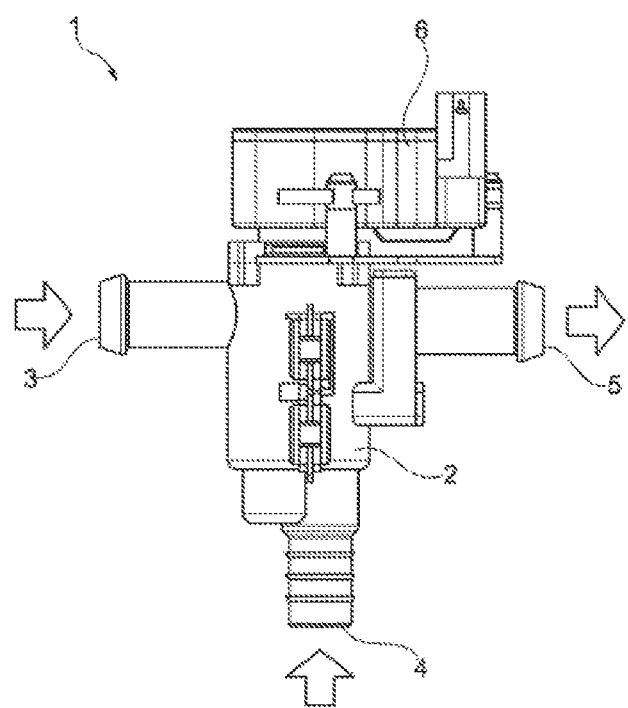

(58) Field of Classification Search
USPC .... 137/607, 614.11, 625.15, 625.31, 625.41, 137/625.46
See application file for complete search history.

(56) References Cited

U.S. PATENT DOCUMENTS

| | | | | |
|---|---|---|---|---|
| 2002/0066276 A1* | 6/2002 | Kawano | ................ | F16K 11/074 62/6 |
| 2006/0144450 A1* | 7/2006 | Hasegawa | ........... | F16K 11/0525 137/625.46 |
| 2008/0295525 A1* | 12/2008 | Xu | ........................ | F16K 31/041 62/6 |
| 2013/0081727 A1* | 4/2013 | Sugie | .................... | F16K 11/076 137/862 |

OTHER PUBLICATIONS

International Search Report and Written Opinion from Corresponding Application No. PCT/EP2015/073915; dated Dec. 4, 2015.
English Translation of Response to International Preliminary Report on Patentability Chapter II and annexes; dated Aug. 17, 2016.
International Preliminary Report on Patentability Chapter II and annexes of PCT/EP2015/073915 ; dated Apr. 20, 2017.
English Translation of Response to International Preliminary Report on Patentability Chapter II and annexes with claim amendments; dated Aug. 17, 2016.

* cited by examiner

VALVE DEVICE

The invention relates to a valve device, comprising a valve housing which has at least three connection openings, each of which opens into a chamber of the valve device.

Valve devices are fundamentally known in the prior art. For controlling or regulating a flow of fluid in a cooling circuit of a motor vehicle, for example, it is known to use a valve device that closes off or opens up at least one throughflow cross-section in the fluid circuit, as needed. If the cooling circuit comprises a plurality of sub-circuits, it is also known to route the fluid to a main cooling circuit or an auxiliary cooling circuit by using a valve to open up one throughflow cross-section and close off another throughflow cross-section. For this purpose, the valve device has, for example, a valve housing with three connection openings, of which two serve as intake openings and one serves as an outlet opening. In the valve housing, valve elements are provided which allow or prevent the flow of fluid from the intake openings to the outlet opening as needed. Naturally, such a function may also be performed by a plurality of valve devices. However, providing a plurality of valve elements in a valve housing that comprises at least the three connection openings offers a particularly compact solution, which is advantageous particularly in the vehicle construction field with the limited installation space that is available there. Due to the pressure conditions that may exist in the fluid, it is nevertheless difficult to ensure adequate seal tightness when the throughflow cross-sections are actually to be closed off.

It is therefore the object of the invention to devise a valve device that is compact in design and ensures a high degree of seal tightness, so that undesirable leakages, in particular, are avoided.

The object of the invention is achieved by a valve device having the features of claim 1. The valve device has the advantage that, depending on the configuration of the valve elements, a high degree of seal tightness is ensured in a simple manner while at the same time enabling a simple and constructive design. For this purpose, the valve device according to the invention comprises a valve housing which has at least three connection openings, each of which opens into a chamber of the valve device. The valve device according to the invention further comprises two sealing disc units arranged spaced from one another, each of which lies between two adjacent chambers and has adjacent to it a fixed sealing disc and at least one rotatable sealing disc, wherein the rotatable sealing disc and the fixed sealing disc of each sealing disc unit have at least one throughflow opening for opening up a throughflow cross-section between the adjacent chambers, in at least one overlapping position of the throughflow openings. The valve device of the invention further comprises an actuating shaft, which is connected to the rotatable sealing discs for conjoint rotation. Thus two sealing disc units are provided, which separate the three chambers from one another in the valve housing if the throughflow openings of the adjacent sealing discs are not in an overlapping position. The rotatable sealing discs of the two sealing disc units are rotated as needed by a single actuating shaft, in order to open up a throughflow cross-section to at least one of the sealing disc units, and thereby permit a flow from one chamber into the adjacent chamber. By providing two sealing disc units for separating the chambers and thus the connection openings off from one another, a particularly compact solution for the valve device is offered. Since only one actuating shaft is required for actuating the two rotatable sealing discs, even though the rotational movements of said discs are rigidly coupled to one another, various switching states of the valve device can be easily enabled by the corresponding arrangement and configuration of the respective flow openings, while only a single drive unit is necessary for rotating the actuating shaft. The valve device is therefore both cost-effective and less prone to malfunction.

According to an advantageous enhancement of the invention, it is provided that each sealing disc unit has two rotatable sealing discs, each of which is connected to the actuating shaft for conjoint rotation, and each of which rests at least in certain areas against one end face of the fixed sealing disc. Each fixed sealing disc is thus positioned between two rotatable sealing discs, with the three sealing discs resting flat against one another on their end faces. The two outer rotatable sealing discs are designed such that the respective throughflow openings are identical in configuration and are aligned lying axially one above the other, so that between the one rotatable sealing disc and the fixed sealing disc, and between the other rotatable sealing disc and the fixed sealing disc the same throughflow cross-section results during the rotation of the rotatable sealing discs. Because two rotatable sealing discs are provided, arranged on the two sides of the different sealing discs, at least the rotatable sealing disc is always pressed axially against the fixed sealing disc on which the higher fluid pressure is acting, regardless of the adjustment of a pressure gradient over the sealing disc unit. In particular when the valve device is in the closed state, that is to say, when the corresponding sealing disc unit is not opening up a throughflow cross-section, the above configuration serves to ensure that the fluid pressure presses the sealing discs of the sealing disc unit against one another, thereby ensuring high seal tightness with no leakage or with only slight leakage. Particularly in the case of pressure fluctuations that may result during the operation of an entire system that comprises the valve device, and that cause the pressure conditions between the adjacent chambers to be reversed, the other rotatable sealing disc is then pressed against the fixed sealing disc unit, thereby further ensuring the sealing disc.

It is particularly preferably provided that a spring element, in particular a helical spring, is arranged prestressed between the two sealing disc units, with one end of the spring element supported against one of the rotatable sealing discs of the one sealing disc unit and the other end supported against one of the rotatable sealing discs of the other sealing disc unit. The spring element ensures that, even if the fluid pressure in the chamber between the two sealing disc units is low, each of the rotatable sealing discs lying in this chamber is forced against the respective fixed sealing disc of the respective sealing disc unit, thereby ensuring the seal tightness of the system.

According to an advantageous enhancement of the invention, an additional spring element, in particular an additional helical spring, is assigned to the one sealing disc unit, and is supported at one end on the valve housing side and at the other end against the one sealing disc unit. The additional spring element is thus arranged clamped between the one sealing disc unit and, in particular, a valve housing base or a valve housing cover that seals the valve housing. In particular, it is provided that the additional spring element is supported against one of the rotatable sealing discs of the sealing disc unit. More particularly, if a spring element is provided between the two sealing disc units, as described above, each of the two rotatable sealing discs in the one sealing disc unit is thereby forced against the respective fixed sealing disc, thereby ensuring a particularly high degree of seal tightness. At the same time, the one sealing disc unit is thereby forced against the other sealing disc unit by the additional spring element—with the spring element arranged therebetween.

According to an advantageous enhancement of the invention, it is further provided that the additional spring element is prestressed between the sealing disc unit or the rotatable sealing disc of the one sealing disc unit and a coupling element assigned to one end of the actuating shaft, with the coupling element being supported in particular axially against the valve housing or against the actuating shaft, and projecting in some areas through an opening in the valve housing or the valve cover. The coupling element thus serves as a connecting element for the drive unit mentioned above for actuating the actuating shaft. The coupling element is made, in particular, of a material that will form a seal with the housing by the axial contact of the coupling element against the housing. Of course, the coupling element may also rest axially against the housing with a sealing element, for example an O-ring, therebetween. The spring force supplied by the additional spring element forces the coupling element against the housing at one end, and at the other end forces the rotatable sealing disc against the fixed sealing disc of the one sealing disc unit so as to ensure both a tight seal against the outside and a tight seal within the valve device.

It is further preferably provided that the fixed sealing disc of the other sealing disc unit is forced by the spring force of the additional spring element against an axial stop of the housing. The valve housing is provided with an axial stop that cooperates with the fixed sealing disc of the other sealing disc unit. The additional spring element is thus supported at one end on the housing side or against the coupling element and at the other end, via the one sealing disc unit and the other sealing disc unit, against the axial stop of the housing. The sealing disc units are thus held prestressed in the axial direction in the valve housing, in particular by the spring force of the additional spring element, thereby enabling in a simple manner both a secure locking and a compensation of production-related tolerances.

It is particularly preferably provided that a support sleeve is positioned between the fixed sealing discs, with each of the fixed sealing discs resting axially against one end face of the support sleeve. For this purpose, the fixed sealing discs advantageously have a greater diameter than the outer diameter of the rotatable sealing discs, so that the fixed sealing discs protrude laterally or radially beyond the rotatable sealing discs. The support sleeve has an external diameter of corresponding size and, in particular, also has an inner diameter which is greater than the outer diameter of the rotatable sealing discs, allowing the fixed sealing discs to rest directly on the end faces of the support sleeve, without interfering with the functioning of the rotatable sealing discs. The support sleeve transmits axial forces directly from the fixed sealing disc of the one sealing disc unit to the fixed sealing disc of the other sealing disc unit. In particular, the spring force of the additional spring element can thereby be advantageously conducted from the one sealing disc unit to the other sealing disc unit. The support sleeve bridges the spring element that is provided between the two sealing disc units, while at the same time ensuring a minimum distance between the two sealing disc units, in particular between the two fixed sealing discs of the sealing disc units. If the fixed sealing disc of the other sealing disc unit rests against the axial stop of the housing, the force of the additional spring element will be transferred directly from the one sealing disc unit via the support sleeve to the other sealing disc unit and to the housing. The force profile thus extends from the additional spring element through the one rotatable sealing disc of the one sealing disc unit, the fixed sealing disc of the one sealing disc unit, the support sleeve and the fixed sealing disc of the other sealing disc unit into the axial stop of the valve housing.

It is further preferably provided that the actuating shaft is held axially displaceably in the sealing disc units. The actuating shaft can thus be displaced axially in relation to the sealing disc units, thereby ensuring a compensation of tolerances, while avoiding a redundancy of the sealing disc units and the arrangement thereof, so that the seal tightness of the valve device is ensured at all times.

It is further preferably provided that the actuating shaft has a polygonal outer contour, at least in the region of the sealing disc units. As viewed in cross-section, the cross-section of the actuating shaft thus deviates from a circular shape, so that a positive rotation lock can be or is produced with the sealing discs of the sealing disc units that are to be rotated. It can further be provided that the rotatable sealing discs have an opening with a corresponding contour, which interacts in a positive manner with the actuating shaft to form the rotation lock. The positive rotation lock, which ensures that the rotatable sealing discs are co-rotated whenever the actuating shaft is actuated, ensures the reliable functioning of the valve device for adjustment of the throughflow cross-sections in a particularly simple manner.

It is further preferably provided that each rotatable sealing disc has a central recess through which the actuating shaft is guided, and in each of which an insert is arranged, which is positively connected in the direction of rotation to the respective rotatable sealing disc and/or to the actuating shaft. In contrast to the preceding embodiment, it is thus provided in this case that the actuating shaft is connected to the rotatable sealing discs not directly, but via an insert that connects the two to one another and is arranged in the recess of each sealing disc. The provision of an insert element enables the sealing discs and the actuating shaft to be made of a material that is optimal for the task in a specific case. For instance, it is provided in particular that the sealing discs are made of a ceramic material and the actuating shaft is made of metal. The inserts may be made of plastic, for example, to reliably ensure the transfer of torque from the actuating shaft to the ceramic sealing discs, while at the same time being softer than the materials of the actuating shaft and the respective sealing disc in order to avoid damage, in particular to the sealing discs if stresses should occur. The inserts preferably have a central opening, the contour of which corresponds to the outer contour of the actuating shaft, and have a polygonal outer contour which, together with a correspondingly polygonal contour of the recess of the respective rotatable sealing disc, forms an additional rotation lock.

It is further advantageously provided that a sealing element is arranged axially stressed between two inserts of each sealing disc unit. The sealing element can, in particular, be an O-ring. The provision of the sealing element between the two inserts of a sealing disc unit ensures that the fluid cannot pass between the two inserts into the intermediate space between actuating shaft and insert and lead to leakage there. The sealing element thus further increases the seal tightness or the degree of seal tightness of the valve device.

It is further preferably provided that at least one of the inserts has at least one guide element for one of the spring elements. At least one of the spring elements, in particular if it is embodied as a helical spring, is thus held, in particular guided radially, by the corresponding insert. As a result, the stability of the valve device, more particularly the functioning of the spring element, is durably ensured. In particular, it can be provided that the inserts that lie in the sealing discs, each of which is assigned one of the spring elements, have corresponding guide elements. All inserts preferably have corresponding guide elements, and the spring elements, in particular, have the same design, so that they can work together with the guide elements of each insert. This enables the inserts to be designed as identical to one another, allowing production costs to be reduced. This also offers a simple way to prevent a faulty assembly of the inserts.

It is further preferably provided that the fixed sealing discs each have at least one radial protrusion and/or one radial depression, which interacts respectively with a radial depression or with a radial protrusion of the valve housing as a rotation lock. In this way, a positive rotation lock and thus the fixing of the fixed sealing discs with the valve housing is ensured, so that when the actuating shaft is actuated, only the rotatable sealing discs are rotated, and not the fixed sealing disc.

Figure 2:
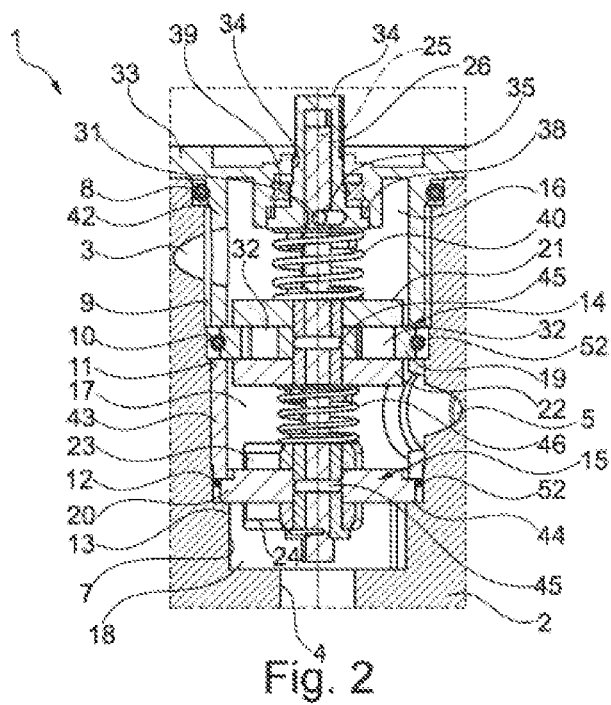
Figure 3:
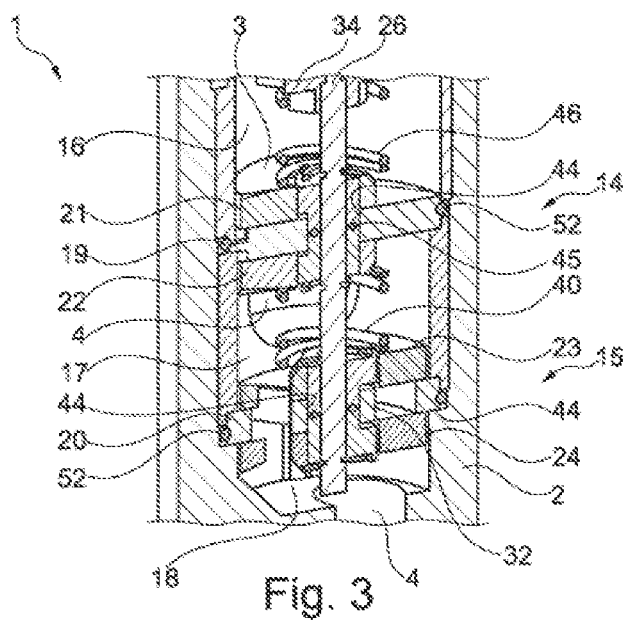
Figure 4:
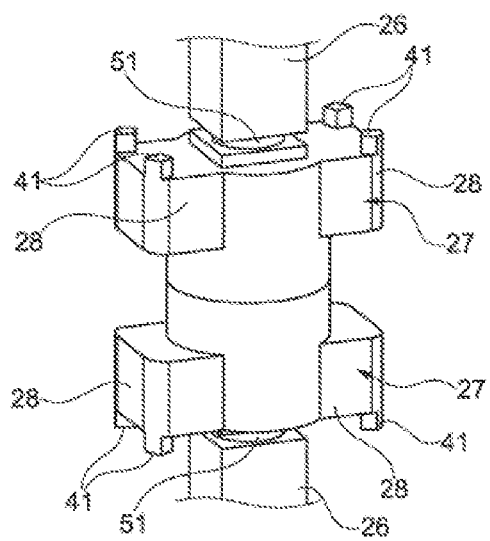
Figure 5:
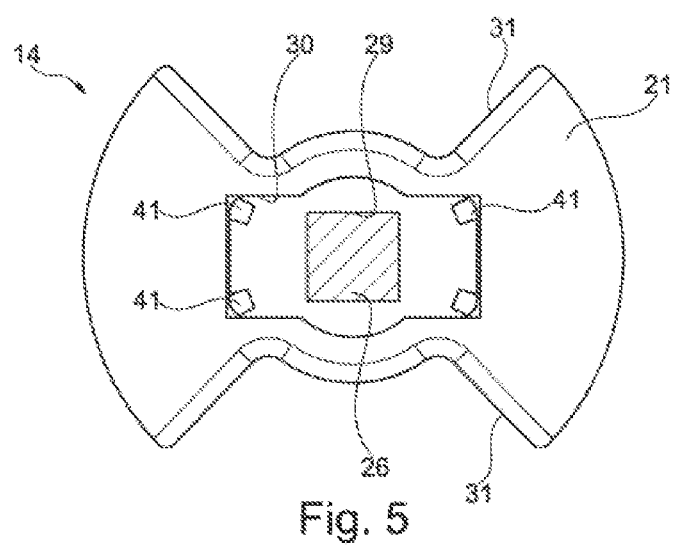
Figure 6:
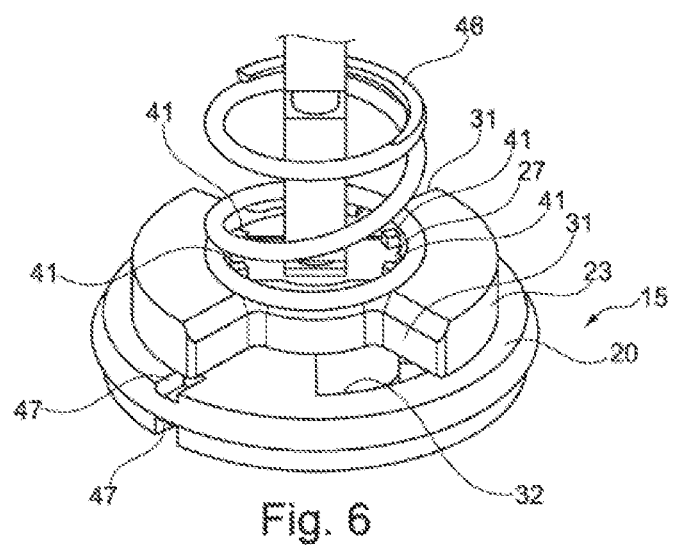
Figure 7:
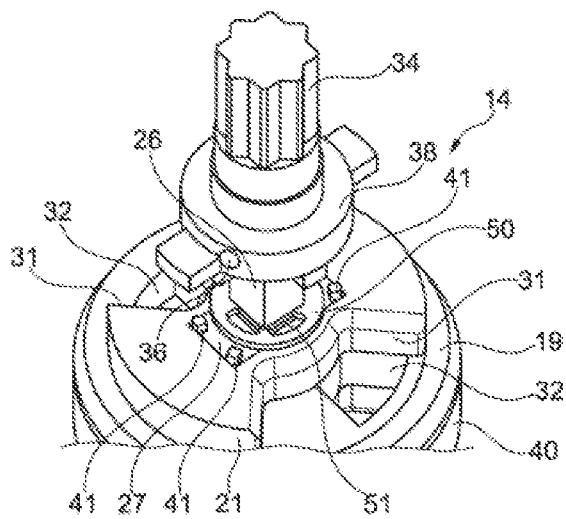
Figure 8:
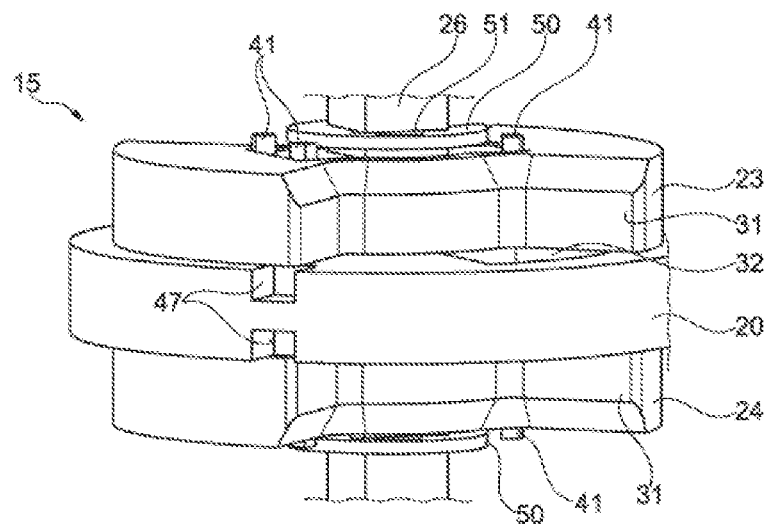
Figure 9:
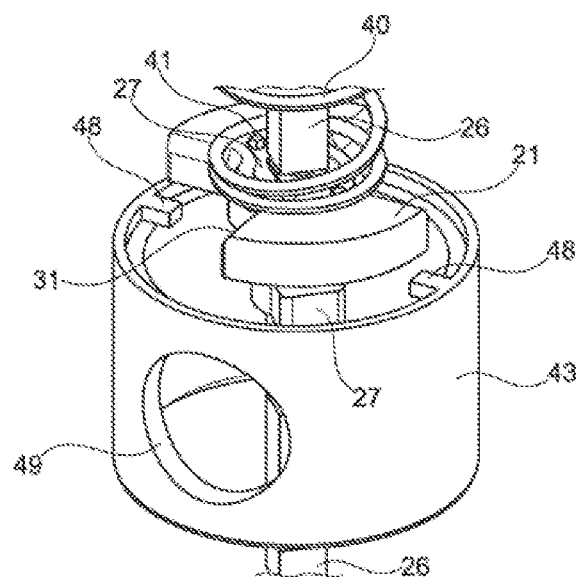

In the following, the invention will be described in greater detail in reference to an embodiment example. The drawings show:

FIG. 1 a valve device from a side view,

FIG. 2 a sectional diagram of the valve device,

FIG. 3 a perspective sectional diagram of the valve device,

FIG. 4 a first detailed view of the valve device, in a perspective diagram,

FIG. 5 a second detailed view of the valve device, in a sectional diagram,

FIG. 6 a third detailed view of the valve device, in a perspective diagram,

FIG. 7 a fourth detailed view of the valve device, in a perspective diagram, FIG. 8 a fifth detailed view of the valve device, in a perspective diagram, and FIG. 9 a sixth detailed view of the valve device, in a perspective diagram.

FIG. 1 shows a plan view of a valve device 1, designed for controlling or regulating fluid flows, for example, in a cooling circuit of a motor vehicle. For this purpose, valve device 1 comprises a valve housing 2, which is provided with three connection openings 3, 4 and 5. Connection openings 3, 4 and 5 are formed by connecting ports, which protrude radially (connecting ports with connection openings 3 and 5) or axially (connecting port with connection opening 4) from the substantially cylindrical valve housing 2. Valve device 1 further comprises a drive unit 6, which is assigned to a side of the valve housing 2 opposite connection opening 4. Drive unit 6 has, in particular, a controllable electric motor.

FIG. 2 shows a sectional diagram of valve housing 2. Valve housing 2 has a cylindrical axial receptacle 7 that is graduated in multiple stages. Axial receptacle 7 extends with a gradually decreasing diameter from the end face assigned to drive unit 6 up to connection opening 4. In the present case, six stages 8, 9, 10, 11, 12 and 13 are provided, in addition to connection opening 4. Connection opening 4—as was mentioned above—opens axially into axial receptacle 7, specifically in the region of the last stage 13. Connection opening 5 opens into axial receptacle 7 in the region of stage 11, and connection opening 3 opens in the region of stage 9.

In axial receptacle 7, two sealing disc units 14, 15 are arranged spaced axially from one another, with sealing disc unit 14 lying between connection openings 3 and 4 and sealing unit 15 lying between connection openings 5 and 4, so that three chambers 16, 17, 18 are formed in axial receptacle 7, with one of connection openings 3, 4, 5 opening into each chamber.

The two sealing disc units 14, 15 each have one fixed sealing disc 19, 20 and two rotatable sealing discs 21, 22 and 23, 24, respectively. Each of the rotatable sealing discs 21, 22 and 23, 24 rests flat against the fixed sealing disc 19 or 20 respectively assigned to it, so that each of the sealing disc units 14, 15 forms a sealing disc packet comprising three adjoining sealing discs, with the sealing disc units 14, 15 being arranged parallel to one another, so that a common rotational axis 25 is produced for rotatable sealing discs 21 to 24. Sealing discs 19 to 23 are preferably made of a ceramic material.

An actuating shaft 26 extends through the sealing disc units 14, 15, with the rotational axis of said shaft corresponding to rotational axis 25. Actuating shaft 26 has a substantially square cross-section, as is clear, for example, from FIGS. 4 and 5. To ensure the co-rotation of sealing discs 21, 22 and 23, 24, two identically designed inserts 27 for each sealing disc unit 14, 15 are provided on actuating shaft 26. As is clear, in particular, from FIG. 4, the inserts 27 have a T-shaped contour from a side view. In a first segment, they are designed as cylindrical, giving them radially protruding co-rotation elements 28 in a second segment. The width of the co-rotation elements 28 is chosen as somewhat narrower than the diameter of the cylindrical segment, as is also clear, for example, from FIG. 5, which shows a plan view (in the direction of axis 25) of the rotation lock formed by one of the inserts 27. The inserts 27 are equipped with a central opening 29, which has a square cross-section. The square cross-section of opening 29 corresponds to the square cross-section of the actuating shaft 26, so that a positive rotation lock is created between each insert 27 and the actuating shaft 26. Openings 29 and actuating shaft 26 are preferably designed such that each insert 27 can be pressed onto the actuating shaft 26 in such a way that the insert 27 in question is held on the actuating shaft 26 substantially by a force locking closure in the axial direction. Alternatively, it is preferably provided that actuating shaft 26 is held in the respective insert 27 so as to be axially displaceable.

As is clear, in particular, from FIG. 5, which shows the aforementioned rotation lock in sealing disc 21 by way of example, the otherwise identically configured sealing discs 21 to 24 each have a central recess 30. The contour of recess 30 corresponds substantially to the contour of insert 27 in the region of co-rotation elements 28.

Insert 27 lies in recess 30 substantially without play, at least laterally. Recess 30 is preferably designed to be somewhat longer than the distance between the end surfaces of protrusions 28 so as to enable compensation for tolerances in at least one direction up to a displacement of the respective sealing element 21 to 24 in relation to insert 27, to allow compensation of temperature-induced size differences, for example. The two inserts 27 of one sealing disc unit 14, 15 are arranged mirror symmetrically relative to one another, with the cylinder segments facing one another.

Sealing discs 19 and 20 each have a central recess 44, through which actuating shaft 26 and the cylindrical segments of inserts 27 are guided. The recesses 44 have a circular contour, and hence serve as swivel bearings for the cylindrical segments of inserts 27. Advantageously, a sealing element, in particular an O-Ring 45, is held clamped axially between the inserts 27 of each sealing disc unit 14, 15, forming a tight connection between inserts 27 at this point.

As is clear from FIG. 5, which is a plan view of sealing disc 21, said disc is provided with two diametrically opposite throughflow openings 31. Sealing discs 21 to 24 are basically circular in shape. The throughflow openings 31 are formed by radial depressions that are open to the edge of the disc. The fixed sealing discs 19, 20 likewise have throughflow openings 32, as is clear, in particular, from FIGS. 2 and 3 and from 5 and 6. Throughflow openings 32 are likewise formed diametrically opposite one another in the respective sealing discs 19, 20. Throughflow openings 32 are designed such that they can be overlapped completely by the sealing disc 21, 22 or 23, 24 in question. When sealing discs 21 to 24 are rotated so as to bring throughflow openings 31 and 32 into an overlapping position, as shown in FIGS. 6 and 7, a corresponding throughflow cross-section is opened up between the adjacent chambers, which are separated from one another by the respective sealing disc unit 14, 15. The rotatable sealing discs 21, 22 and 23, 24 of the respective sealing disc units 14, 15 are aligned parallel to one another so that they cover one another from a plan view; hence, when they are rotated accordingly, the throughflow cross-section of one sealing disc unit is opened up by the two sealing discs. In principle, the sealing disc units 14, 15 are at least substantially identical in design, however in the present case they are arranged rotated 90° relative to one another in the valve housing, so that when a maximum possible throughflow cross-section is opened up by the one sealing disc unit 14, the other sealing disc unit 15 separates chambers 17, 18 completely from one another.

Valve housing 2 is sealed off at the end face opposite connection opening 4 by a cover element 33. Cover element 33 has an opening through which the actuating shaft 26 projects partially. A coupling element 34 is placed on the free end of actuating shaft 26, with the inner contour of said coupling element corresponding to the square cross-sectional contour of the actuating shaft 26, so that coupling element 34 and actuating shaft 26 are connected to one another for conjoint rotation. To arrest coupling element 34 axially on actuating shaft 26, actuating shaft 26 is provided with a lateral recess 35 and coupling element 34 is provided with a pin channel 36. During assembly, a locking pin 37 is inserted into pin channel 36, and pin channel 36 extends up to actuating shaft 26 far enough that part of the pin channel is formed by depression 35. Pin 37 is thereby clamped between actuating shaft 26 and coupling element 34, arresting the latter axially on actuating shaft 26. Coupling element 34 is preferably made of plastic.

At its end that faces axial receptacle 7, coupling element 34 has a radial collar 38, as is shown in FIG. 7. Collar 38 extends around the entire circumference of coupling element 34. Collar 38 serves as an axial stop for coupling element 34 on housing cover 33, with a sealing ring 39 preferably being held between housing cover 33 and radial collar 38, so that fluid is prevented from passing out of chamber 16 through cover 13.

Radial collar 38 further forms a stop for a spring element 40, which in the present case is designed as a helical spring and is held prestressed between coupling element 34 and sealing disc 21 of sealing disc unit 14. To guide the helical spring, it is provided that the corresponding insert 27 has a plurality of guide elements 41 that serve to guide the helical spring laterally. Spring element 40 is thereby reliably prevented from sliding out of position on sealing disc 21, as is shown, for example, in FIG. 6.

Housing cover 33 further has a cylindrical sleeve segment 42, the inner diameter of which is greater than the outer diameter of sealing disc 21 and is smaller than the inner diameter of stage 9 of receptacle 7. Sleeve segment 42 extends axially, up to the point at which it rests axially with its free end face on the fixed sealing disc 19 of sealing disc unit 14. When housing cover 33 is secured to valve housing 2, sealing disc 19 is inserted through sleeve segment 42 into receptacle 7. Sleeve segment 42 naturally has corresponding openings in its outer wall for fluidic connection to connection openings 3. Furthermore, spring element 40, which is supported against coupling element 34 and thus against housing cover 33 on the housing side, forces sealing disc 21 against sealing disc 19, so that these lie against one another forming a tight seal.

In chamber 17, as is clear in particular from FIGS. 2 and 3, a support sleeve 43 is provided, which rests axially at its unattached end-face ends on sealing disc 19 at one end and on sealing disc 20 at the other end. Support sleeve 43 thus likewise has an inner diameter that is greater than the outer diameter of sealing discs 23 and 22. Sealing disc 21 is forced by the spring force of spring element 40 against sealing disc 19, thereby forcing sealing disc 19 against support sleeve 43, which in turn acts on sealing disc 22 with an axial force, forcing said disc against an axial stop 44 of valve housing 2. Axial stop 44 is then formed by the transition from stage 12 to stage 13. Sealing disc units 14 and 15 are thus held in axial receptacle 7 by spring element 40 and support sleeve 43. Support sleeve 43 and sleeve segment 42 ensure that a minimum distance is constantly maintained between sealing disc units 14, 15, and between sealing disc unit 14 and coupling element 34.

In addition, a spring element 46 is held axially prestressed between sealing discs 22 and 23, with spring element 46 likewise being designed as a helical spring, as is clear, for example, from FIGS. 2, 3 and 6. FIG. 6 shows a detailed view of control unit 15 from a perspective view. In this case, spring element 46 rests on sealing disc 23. Insert 27, which is inserted into sealing disc 23, is equipped with the guide elements 41 described above, which serve to guide spring element 46. Sealing disc 20 has at least one radial depression 47 on its outer periphery. Support sleeve 43 has radial protrusions 48 that correspond with radial depression 47, as is shown in FIG. 9. During assembly, each of radial protrusions 48 extends into a radial depression 47 in sealing disc 20, thereby producing a positive rotation lock between sealing disc 20 and support sleeve 43. Sealing disc 19 is provided with corresponding radial depressions 47, which cooperate with the corresponding radial protrusions 48 of support sleeve 43. Support sleeve 43 expediently also has an opening 49, designed to provide the fluidic connection between chamber 17 and connection opening 5.

FIG. 8 shows a detailed view of sealing disc unit 14; these details apply similarly to sealing disc unit 15. To secure sealing disc unit 14 on actuating shaft 26, locking rings 50 are provided, portions of which extend into a radial depression 51 that extends around the circumference of actuating shaft 26, as is also shown in FIG. 7. One locking ring 50 is arranged on each side of sealing disc units 14 and 15, so that the sealing disc units are secured axially by securing rings 50 on actuating shaft 26. During installation, a subassembly unit, in particular comprising the sealing disc units 14, 15 with the support sleeve 43 arranged therebetween, and with spring element 46 clamped therebetween, can thereby be produced in a simple manner. This enables a particularly simple subassembly and assembly of valve device 1. Actuating shaft 26 is thereby held so as to be axially displaceable relative to the sealing disc units 14 and 15, in order to enable a compensation for tolerances and a compensation for temperature-induced size changes, for example.

As an alternative to providing a corresponding locking ring 50 at the end of the actuating shaft 26 that faces connection opening 4, an axial stop may also be formed by an enlargement of the diameter or the cross-section of the actuating shaft 26, up to which the sealing disc unit 15 can be pushed with sealing disc 24.

As is shown in FIGS. 2, 3, 6 and 7, sealing rings 52, designed, for example, as O-Rings, are assigned to the outer lateral surfaces of sealing discs 19, 20. During assembly, the sealing rings are clamped radially between sealing discs 19 and 20 and the inner side of axial receptacle 7. Here, sealing disc 19 lies in the region of stage 10 and sealing disc 20 lies in the region of stage 12. Since stages of different diameters are provided, decreasing in size toward connection opening 4, the assembly, in particular the insertion of the subassembly unit into axial receptacle 7, is facilitated, since clamping in the axial receptacle 7 is prevented. Furthermore, this results in improved friction behavior during insertion of the above-described subassembly unit.

The subassembly unit preferably also comprises coupling element 34, along with the helical spring prestressed between coupling element 34 and sealing disc 21. Since coupling element 34 is likewise held on actuating shaft 26 by pin 37, a compact subassembly unit comprising the essential elements of valve device 1 can thereby be provided and inserted into axial receptacle 7. During assembly, it is then necessary only to place housing cover 33 on valve housing 2 and secure it thereto. Drive unit 6 can then be placed on valve housing 2, and coupling element 34 can be functionally connected to drive unit.

During operation of valve device 1, the throughflow cross-sections of sealing disc unit 15 and sealing disc unit 14 are adjusted by actuating the actuating shaft 26 by means of drive unit 6. Preferably, radial stops can be assigned to actuating shaft 26 and/or to coupling element 34, preventing actuating shaft 26 from rotating beyond a certain angle, thereby avoiding maladjustments.

Regardless of the pressure conditions in chambers 16, 17 and 18, the advantageous design of valve device 1 ensures that the seal tightness of the device is constantly maintained and no leakage is permitted. Since the fixed, that is to say non-rotatable, sealing discs 19, 20 are bordered on both sides by rotatable sealing discs 21, 22 or 23, 24, a tight connection is constantly ensured, regardless of the direction in which a pressure gradient exists over the respective sealing disc unit 14, 15.

The invention claimed is:

1. A valve device, comprising a valve housing which has at least three connection openings, each of which opens into a chamber of the valve device, and further comprising two sealing disc units arranged at a distance from one another, each of which lies between two adjacent chambers and has a fixed sealing disc and at least one rotatable sealing disc, wherein each of the rotatable sealing discs and fixed sealing discs of each sealing disc unit has at least one throughflow opening in order, in at least one overlapping position of the throughflow openings, to open up a throughflow cross-section between the adjacent chambers, said valve device also comprising an actuating shaft, which is connected to the rotatable sealing discs for conjoint rotation, wherein each sealing disc unit has two rotatable sealing discs, each of which is connected to the actuating shaft for conjoint rotation, and each of which rests on an end face of the respective fixed sealing disc.

2. The valve device according to claim 1, wherein a spring element, in particular a helical spring, is arranged in an axial, prestressed configuration between the two sealing disc units, wherein the spring element is retained at one end against one of the rotatable sealing discs of one sealing disc unit, and at the other end against one of the rotatable sealing discs of the other sealing disc unit.

3. The valve device according to claim 2, wherein an additional spring element, is assigned to the one sealing disc unit, with one of said additional spring being retained a housing side and an other end being retained against the one sealing disc unit.

4. The valve device according to claim 3, wherein the additional spring element is axially prestressed between one of the rotatable sealing discs of the one sealing disc unit and a coupling element that is assigned to one end of the actuating shaft.

5. The valve device according to claim 3, wherein the fixed sealing disc of the other sealing disc unit is forced by a spring force of the additional spring element against an axial stop of the valve housing.

6. The valve device according to claim 3, wherein the additional spring element comprises a helical spring.

7. The valve device according to claim 1, wherein each rotatable sealing disc has a central recess through which the actuating shaft is guided, wherein in each recess an insert is arranged, which is form-fittingly connected in the direction of rotation to the respective rotatable sealing disc and/or to the actuating shaft.

8. The valve device according to claim 7, wherein a sealing element is arranged in an axial, prestressed configuration between two inserts of each sealing disc unit.

9. The valve device according to claim 8, wherein at least one of the inserts has at least one guide element for at least one of the spring elements.

10. The valve device according to claim 1, wherein a support sleeve is arranged between the fixed sealing discs, wherein the fixed sealing discs rest axially, on respective end faces of the support sleeve.

11. The valve device according to claim 1, wherein the actuating shaft can be displaced axially in relation to the sealing disc units.

12. The valve device according to claim 1, wherein the actuating shaft has a polygonal outer contour at least in the region of the sealing disc units.

13. The valve device according to claim 1, wherein the fixed sealing discs each have at least one radial protrusion and/or one radial depression, which cooperate with a radial depression or with a radial protrusion of the valve housing to form a rotation lock.

14. The valve device according to claim 5, wherein the sealing disc units, which are secured by locking rings, with one such ring arranged on each side of the respective sealing disc unit, are secured axially on the actuating shaft, and the support sleeve and the spring element are inserted as a subassembly unit into a cylindrical axial receptacle of the valve housing.

\* \* \* \* \*